(12) United States Patent
Rogers (10) Patent No.: US 8,590,585 B2
(45) Date of Patent: *Nov. 26, 2013

(54) APPARATUS AND SYSTEMS FOR INTEGRATION OF A CENTRAL TIRE INFLATION SYSTEM MANIFOLD INTO A WHEEL

(75) Inventor: Larry K. Rogers, Bordentown, NJ (US)

(73) Assignee: Hutchinson, S.A., Paris (FR)

( * ) Notice: Subject to any disclaimer, the term of this patent is extended or adjusted under 35 U.S.C. 154(b) by 2 days.

This patent is subject to a terminal disclaimer.

(21) Appl. No.: 13/404,580

(22) Filed: Feb. 24, 2012

(65) Prior Publication Data

US 2012/0152422 A1    Jun. 21, 2012

Related U.S. Application Data

(63) Continuation of application No. 12/317,779, filed on Dec. 29, 2008, now Pat. No. 8,122,926.

(51) Int. Cl.
   *B60C 29/00* (2006.01)
(52) U.S. Cl.
   USPC .......................................... 152/427; 152/416

(58) Field of Classification Search
   USPC .......................................... 152/415–416, 427
   See application file for complete search history.

(56) References Cited

U.S. PATENT DOCUMENTS

| | | |
|---|---|---|
| 2,634,784 A | 4/1953 | Fitch, Ellery R. |
| 2,969,824 A | 1/1961 | Howard, Frank A. |
| 5,221,381 A | 6/1993 | Hurrell, II |
| 6,474,383 B1 | 11/2002 | Howald et al. |
| 7,168,468 B2 | 1/2007 | Wang et al. |
| 7,686,051 B2 | 3/2010 | Medley et al. |
| 8,122,926 B2 * | 2/2012 | Rogers .......................... 152/427 |
| 2008/0149243 A1 | 6/2008 | Resare et al. |

* cited by examiner

*Primary Examiner* — Jason Bellinger
(74) *Attorney, Agent, or Firm* — Reed Smith LLP (57) ABSTRACT

A system. The system includes a wheel, and a valve assembly secured to an exterior surface of the wheel. The wheel defines a first air passageway. The valve assembly includes a valve member, and an adapter member connected to the valve member. The adapter member adjoins a vehicle wheel hub if the wheel is connected to the vehicle wheel hub. The valve assembly defines a second air passageway and a third air passageway. A first end of the first air passageway adjoins a first end of the second air passageway. A first end of the third air passageway adjoins an air passageway of the vehicle wheel hub if the wheel is connected to the vehicle wheel hub.

20 Claims, 7 Drawing Sheets

APPARATUS AND SYSTEMS FOR INTEGRATION OF A CENTRAL TIRE INFLATION SYSTEM MANIFOLD INTO A WHEEL

CROSS-REFERENCE TO RELATED APPLICATION

This application is a continuation of, and claims the benefit under 35 U.S.C. §120 of the earlier filing date of, U.S. patent application Ser. No. 12/317,779 filed on Dec. 29, 2008, now U.S. Pat. No. 8,122,926.

BACKGROUND

Figure 1:
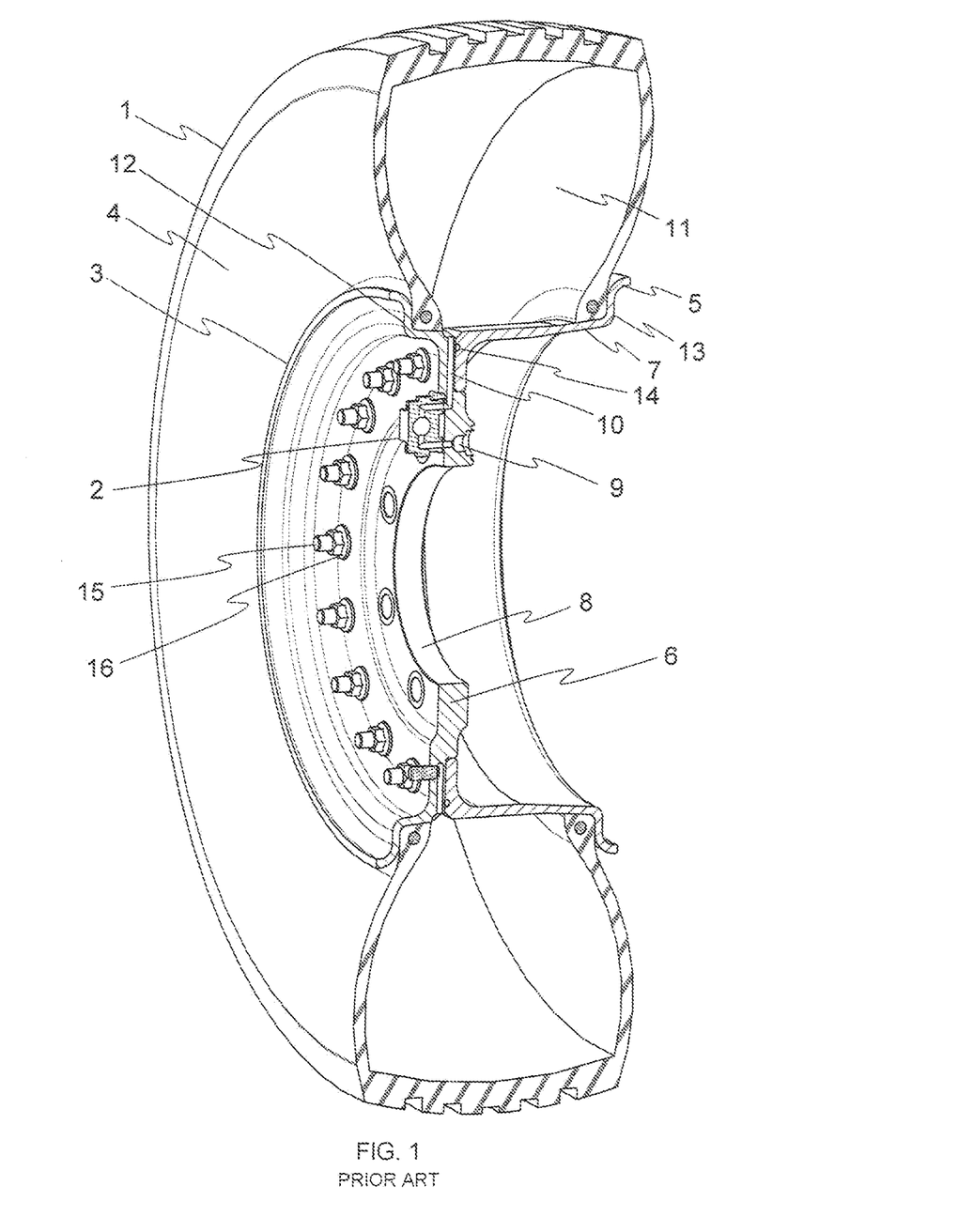
FIG. 1 provides a perspective view of a section of a two-piece wheel assembly with a central tire inflation (CTI) valve connected to the wheel in accordance with the teachings of prior art.

The purpose of this invention is to create a means by which various central tire inflation valve configurations can be connected to a common wheel. FIG. 1 provides an example of a two-piece wheel assembly 1 with a central tire inflation (CTI) valve 2 connected to the wheel 3 in accordance with the teachings of prior art. The two-piece wheel assembly 1 includes a wheel 3 with tire 4 and CTI valve 2. Parts of the wheel 3 include a rim portion 5, disc portion 6, rim flat area 7, hub bore area 8, and CTI airways (both hub side 9 and tire side 10). The tire 4 and rim portion 5 form a tire chamber 11 that contains a pressurized fluid (usually air). Two piece wheels are usually used when a beadlock or run flat device (not shown) are utilized in the two piece wheel assembly. Two-piece wheels include two major parts, the outer rim half 12 and the inner rim half 13. The two rim halves are sealed with an o-ring 14 to prevent air from escaping out of the tire chamber 11. Studs 15 and nuts 16 secure the two rim halves 12 and 13 together.

Figure 2:
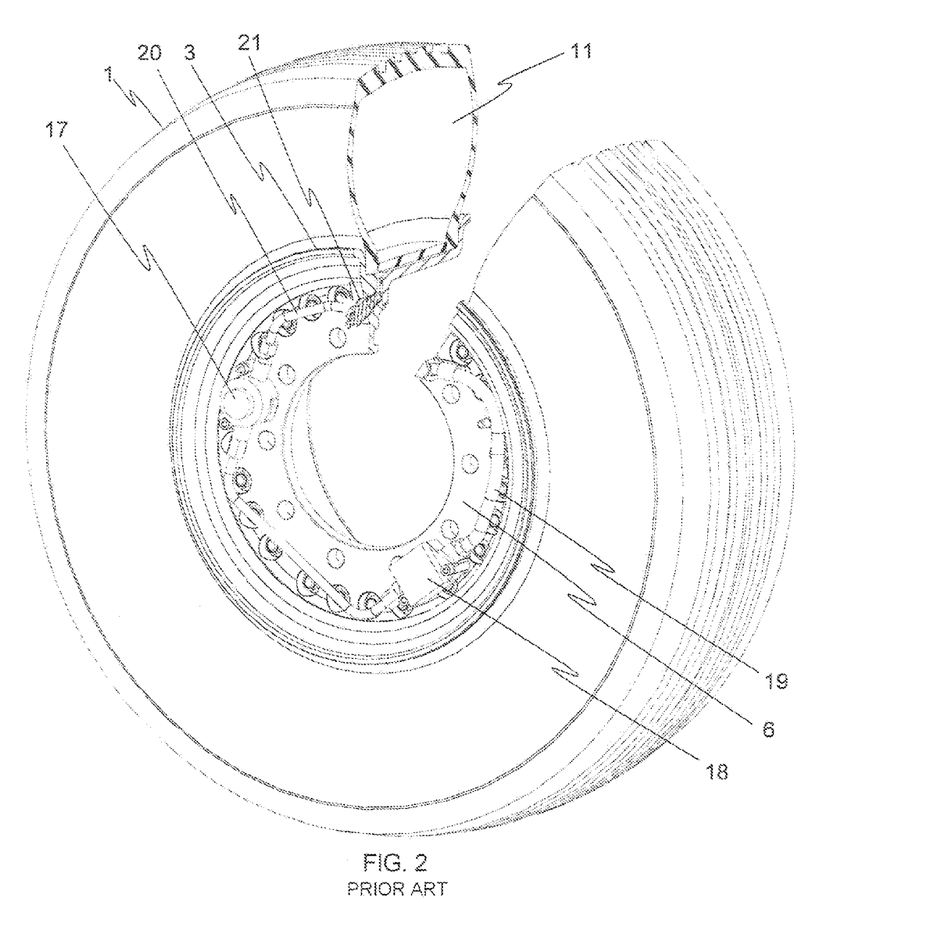
FIG. 2 provides a perspective view of a section of a two-piece wheel configured for an externally mounted CTI valve and a quick release valve, both of which are mounted on the two-piece wheel in accordance with the teachings of prior art.

Current CTI valve technology may, however, employ any one of several configurations. First, the CTI valve can be fixed on the face of the wheel such that an airway from the hub provides air through a channel in the wheel to the valve. The valve then channels the air into a separate airway in the wheel that leads to the tire chamber and inflates the tire. (See, e.g., FIG. 1). U.S. Pat. No. 6,076,578 describes this methodology in detail. Second, FIG. 2 shows a section of a two-piece wheel assembly 1 configured for an externally mounted CTI valve 17 and a quick release valve 18, both of which are mounted on the two-piece wheel 3. The CTI valve 17 and quick release valve 18 are located on the disc 6 of the wheel 3 with a hose 19 coming from the hub and providing air to the valve 17 and quick release 18. The valve 17 and quick release 18 then channels the air to a second hose 20 that interfaces with a fitting 21 on the wheel. The air then passes through the fitting 21 to the tire chamber 11. Third, the CTI valve can be located on the hub of the axle (typically placed at the axis of rotation). Air passes through the hub into the valve. The valve then channels the air into a hose that interfaces with a fitting on the wheel. The air then passes through the fitting to the tire chamber.

However, all of the aforesaid methods and apparatus have disadvantages. For example, with external CTI valve mounting configurations, the disadvantages include: (a) complex assembly requiring a multiplicity of components to function; (b) risk of air leakage due to high number of components; (c) increased cost due to high number of components; (d) increased risk of damage due to valve, hoses, and/or other items protruding from the face of the wheel when the vehicle is in operation; and (e) the excessive time required to assemble and disassemble the high numbers of components inherent in these designs. Likewise, for current internal CTI valve configurations, the disadvantages include: (a) the fact that, because the valve is fixed directly to the wheel, the wheel must be manufactured to specifically accommodate a particular valve or vice versa; (b) increased cost due to the need to provide multiple wheel configurations as required to accommodate various CTI valves; and (c) increased lead time to develop wheels and/or valves to accommodate an existing valve/wheel interface configuration.

SUMMARY

Thus, as previously noted, the purpose of this invention is to avoid the disadvantages of prior art by integrating a CTI Valve manifold into a wheel. In my invention, a wheel/manifold combination is provided such that an air passageway coming from the wheel through the manifold brings air to the valve, and an airway from the valve through the manifold provides air to the tire cavity via a passageway in the wheel. The manifold also allows for the CTI valve to deflate the tire, a typical operational requirement for central tire inflation systems.

The CTI manifold taught herein allows numerous advantages to be realized. First, the manifold is a method of allowing multiple CTI valve interfaces to work with a single wheel interface. A different manifold configuration can be employed for different CTI valves. Second, by having one common interface on the wheel, the wheel does not need to be redesigned and re-qualified to utilize different CTI valves. Third, by having one common interface on the wheel, retrofit in the field is possible as one type of CTI valve can easily be switched out with another, possibly without even taking the wheel off the vehicle. Fourth, and finally, as a reduced variety of wheels needs to be carried in inventory, cost can be reduced.

DESCRIPTION

Figure 3:
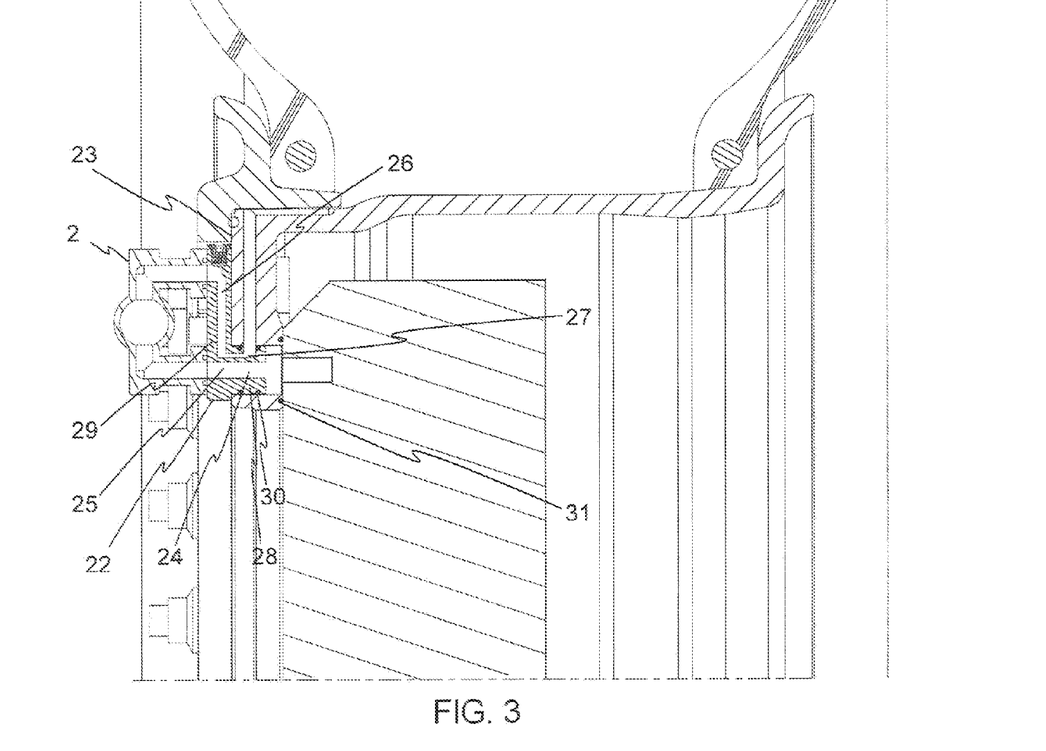
FIG. 3 provides a cross-sectional view of a portion of a two-piece wheel showing a first exemplary preferred configuration for a manifold and a manifold, wheel, CTI Valve combination.
Figure 4:
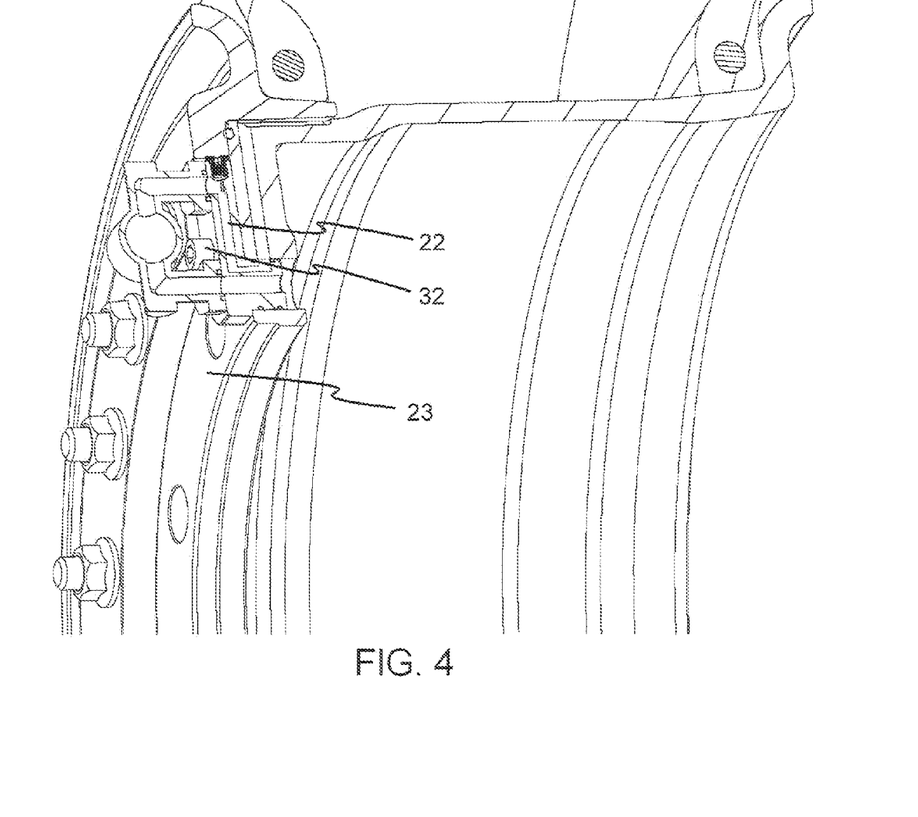
FIG. 4 provides a more detailed perspective view of the configuration illustrated in FIG. 3.

The inventive concept can be actualized in various ways, with illustrative examples being provided in the drawing figures described below. Thus, as a first example, FIGS. 3 and 4 show a general configuration of a manifold 22 on the wheel face 23 with a "hub-side" port 24, internal airways to the valve "hub-side" port 25, the valve 2, internal airways from the valve "tire-side" port 26, and a manifold "tire-side" port 27. A boss 28 protruding from the manifold body 29 pilots into the wheel face 23 (this boss 28 may protrude partially into or completely through the wheel face 23). A sealing methodology is used to ensure no air leakage from any of the manifold or valve hub and tire ports. In this figure, two radial o-rings 30 are shown to seal the manifold tire-side port 27. The manifold hub-side port 25 is sealed using a hub o-ring 31. The manifold tire side port 27 and hub-side port 24 can be sealed by other means including, but not limited to, gaskets, sealed threads, press fits, etc. As most clearly shown in FIG. 4, the manifold 22 can be advantageously secured to the wheel by use of threaded fasteners 32. However, manifold 22 can also be secured to wheel face 23 by means including, but not limited to, threaded fasteners, snap fits, a threaded body, etc.

In terms of operation, air passes from the hub into a "hub side" airway of the wheel and/or the CTI manifold assembly (which consists of a CTI valve fixed to the manifold). The manifold channels the air to the CTI valve. The air passes through the CTI valve and back into a second, separate airway in the manifold. The manifold interfaces with a secondary "tire side" port and airway in the wheel, which then channels the air to the tire cavity. It is obvious that this manifold also allows for the CTI valve to deflate the tire, which is a typical function for central tire inflation systems. It is also a simple matter to change the manifold to accommodate CTI valves with various porting and/or mounting configurations to a wheel with fixed porting.

Figure 5:
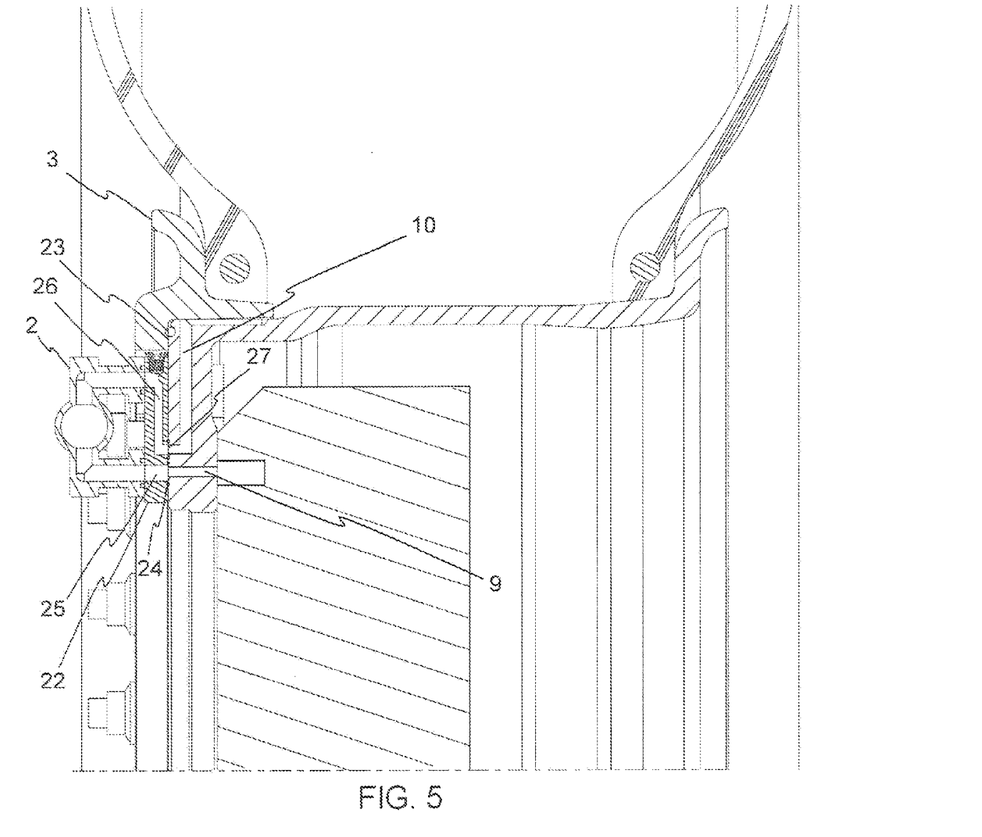
FIG. 5 provides a cross-sectional view of a portion of a two-piece wheel showing a second preferred exemplary configuration for a manifold and a manifold, wheel, CTI Valve combination.

Another possible configuration is illustrated in FIG. 5, which shows an alternative interface between the manifold airways 25 and 26 and the wheel airways 9 and 10. In this case there is no pilot into the wheel face 23, and the manifold 22 is seated entirely on the wheel face 23. A "hub-side" airway 9 from the wheel 3 mates with a "hub-side" port 24 on the manifold 22. A "tire-side" port 27 on the manifold 22 mates with a "tire-side" airway 10 on the wheel face 23. Sealing between the mating ports can be achieved by means including, but not limited to, o-rings, gaskets, sealed threads, etc.

Figure 6:
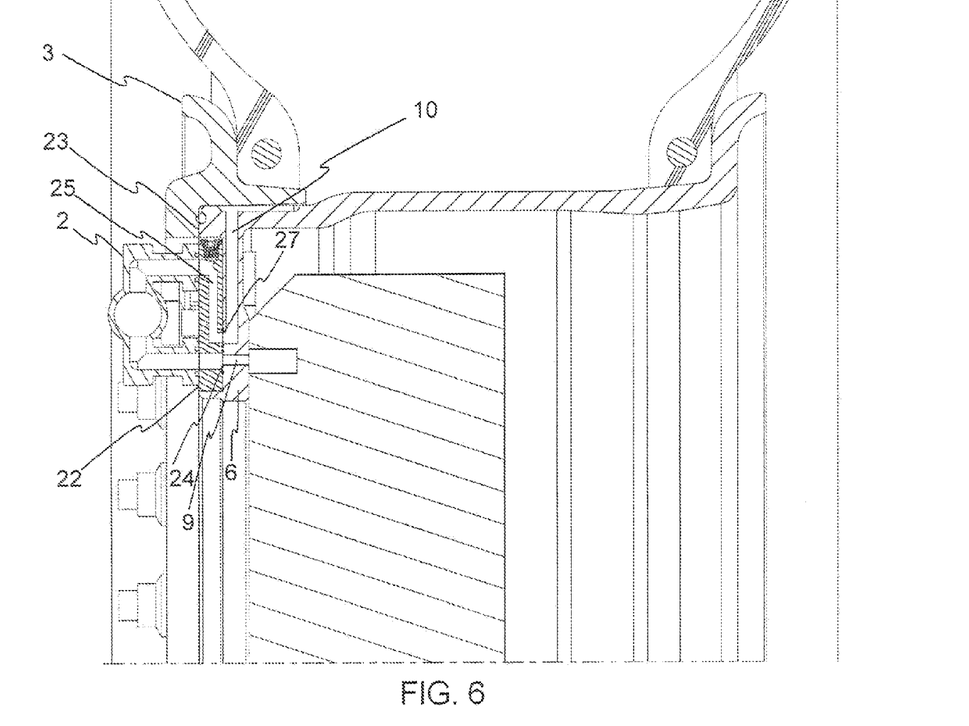
FIG. 6 provides a cross-sectional view of a portion of a two-piece wheel showing a third preferred exemplary configuration for a manifold and a manifold, wheel, CTI Valve combination.

FIG. 6 shows still another alternative interface between the manifold 22 and the wheel 3. In this case the manifold itself 22 is secured entirely within the wheel disc 6. A "hub-side" airway 9 from the wheel 3 mates with a "hub-side" port 24 on the manifold 22. A "tire-side" port 27 on the manifold 22 mates with a "tire-side" airway 10 on the wheel face 23. Sealing between the mating ports can be achieved by means including, but not limited to, o-rings, gaskets, sealed threads, etc.

Figure 7:
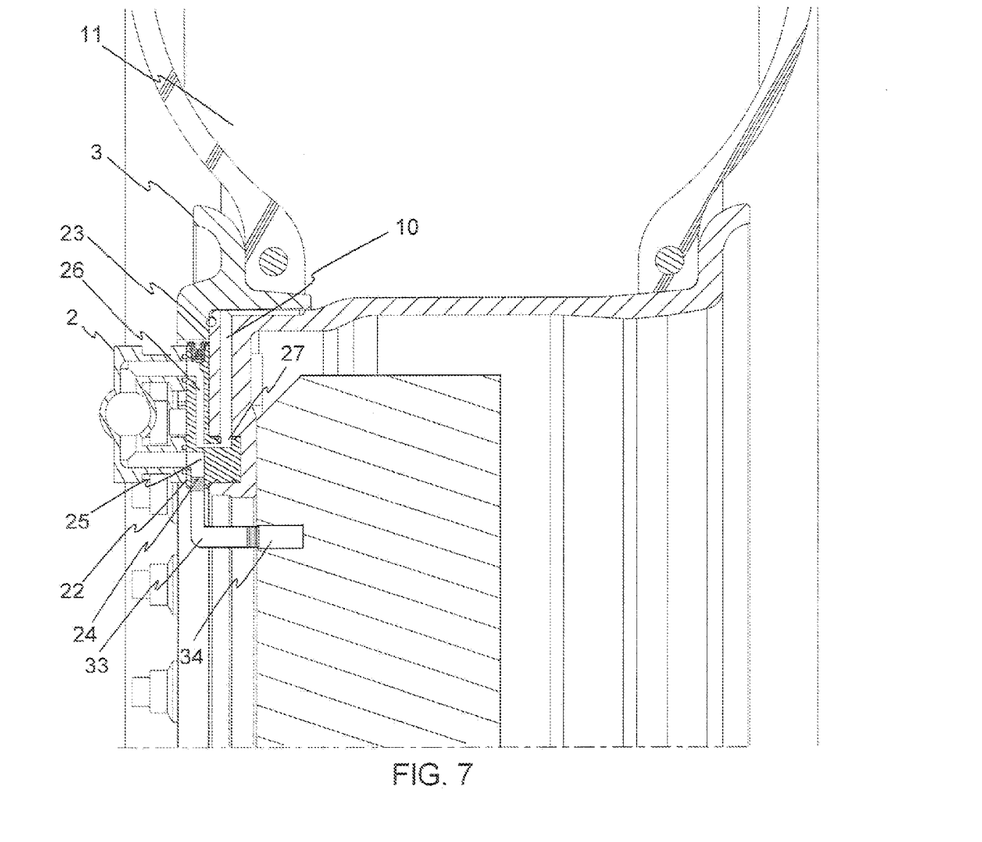
FIG. 7 provides a cross-sectional view of a portion of a two-piece wheel showing a fourth preferred exemplary configuration for a manifold and a manifold, wheel, CTI Valve combination.

Finally, FIG. 7 shows an alternative interface in which an external connection, in this case a hose or tube 33, is used to connect the air source on the hub 34 to the CTI manifold "hub-side" port 25. The manifold 22 then channels the air to the CTI valve 2 and to the tire chamber 11 as described hereinabove. It is obvious that an external connection can be used for either or both the "hub-side" and/or "tire-side" ports on the manifold.

Further, though the configurations shown herein have displayed the manifold attached to the wheel face, it is obvious that this manifold can be affixed to the wheel in any number of places including, but not limited to, the backside of the wheel face, wheel spokes, the rim portion, etc. Moreover, though the configurations shown herein have been demonstrated using a two-piece, bolt together wheel, it is an obvious extension of this concept to apply it to one-piece and three piece wheels as well. From the foregoing, it will be appreciated that numerous variations are possible without exceeding the scope of the inventive concept set forth herein. For example, various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the claims that follow.

PARTS LIST 1 2 Piece Wheel Assembly
2 CTI Valve
3 2 Piece Wheel
4 Tire
5 Rim Portion of wheel
6 Disc Portion of wheel
7 Rim Flat Area
8 Hub Bore Area
9 CTI Airway (Hub)
10 CTI Airway (Tire)
11 Tire Chamber
12 Outer Rim Half
13 Inner Rim Half
14 O-Ring
15 Stud
16 Nut
17 External CTI Valve
18 Quick Release Valve
19 Hub Side Hose/Tube
20 Tire Side Hose/Tube
21 Air Fitting
22 Manifold
23 Wheel Face
24 Hub Side Port (Manifold)
25 Airway from "Hub Side" Port
26 Airway from "Tire Side" Port
27 Tire Side Port (Manifold)
98 Manifold Boss
29 Manifold Body
30 Radial O-Rings (Manifold)
31 Hub O-Ring
32 Threaded Fastener
33 CTI Hose or Tube
34 Air Port on Hub

What is claimed is:

1. A system, comprising:
    a wheel, wherein the wheel defines a first air passageway; and
    a valve assembly secured to an exterior surface of the wheel, wherein the valve assembly comprises:
        an adapter member, wherein the adapter member adjoins a vehicle wheel hub if the wheel is connected to the vehicle wheel hub; and
        a valve member secured to an exterior surface of the adapter member,
    wherein the valve assembly defines a second air passageway and a third air passageway, and wherein:
        a first end of the first air passageway adjoins a first end of the second air passageway; and
        a first end of the third air passageway adjoins an air passageway of the vehicle wheel hub if the wheel is connected to the vehicle wheel hub.
2. The system of claim 1, wherein the wheel comprises:
    an outer rim half; and
    an inner rim half secured to the outer rim half.

3. The system of claim 2, wherein the outer rim half defines a first circumferential flange section and the inner rim half defines a second circumferential flange section.

4. The system of claim 3, wherein the first and second circumferential flange sections define an outer periphery of the wheel therebetween, and wherein a second end of the first air passageway opens proximate the outer periphery of the wheel.

5. The system of claim 1, wherein the wheel comprises a disc portion, and wherein the valve assembly extends along a thickness of the disc portion.

6. The system of claim 1, wherein at least one of the following:
   a second end of the second air passageway is axially offset from the first end of the second air passageway; and
   a second end of the third air passageway is axially offset from the first end of the third air passageway.

7. The system of claim 1, wherein the adapter member defines at least one of the following:
   the second air passageway; and
   the third air passageway.

8. The system of claim 1, wherein the adapter member is secured to the exterior surface of the wheel.

9. The system of claim 1, wherein the valve member defines a fourth air passageway and a fifth air passageway, wherein:
   a first end of the fourth air passageway adjoins a second end of the second air passageway; and
   a first end of the fifth air passageway adjoins a second end of the third air passageway.

10. The system of claim 7, wherein a second end of the fourth air passageway and a second end of the fifth air passageway are in fluid communication with one another.

11. The system of claim 1, further comprising a sealing member positioned against the adapter member.

12. A system, comprising:
    a wheel, wherein the wheel defines first and second air passageways;
    an adapter member secured to the wheel, wherein the adapter member defines:
        a third air passageway in fluid communication with the first air passageway; and
        a fourth air passageway in fluid communication with the second air passageway; and
    a valve member secured to an exterior surface of the adapter member, wherein the third air passageway and the fourth air passageway are in fluid communication with one another, and wherein at least one of the following:
        a first end of the third air passageway is axially offset from a second end of the third air passageway; and
        a first end of the fourth air passageway is axially offset from a second end of the fourth air passageway.

13. The system of claim 12, wherein the adapter member and the valve member are separate and distinct from one another.

14. The system of claim 12, wherein the first air passageway is in fluid communication with an interior of a tire if the tire is mounted on the wheel.

15. The system of claim 12, wherein first and second circumferential flange sections of the wheel define an outer periphery of the wheel therebetween, and wherein a first end of the first air passageway opens proximate the outer periphery of the wheel.

16. The system of claim 15, wherein a second end of the first air passageway is axially aligned with a first end of the third air passageway.

17. The system of claim 12, wherein the second air passageway is in fluid communication with a hub port of a vehicle wheel hub if the wheel is connected to the vehicle wheel hub.

18. The system of claim 12, wherein a first end of the second air passageway adjoins a vehicle wheel hub if the wheel is connected to the vehicle wheel hub.

19. The system of claim 18, wherein a second end of the second air passageway is axially aligned with a first end of the fourth air passageway.

20. The system of claim 12, further comprising a sealing member positioned against the adapter member.

* * * * *